United States Patent [19]

Newberg

[11] Patent Number: 5,051,754
[45] Date of Patent: Sep. 24, 1991

[54] OPTOELECTRONIC WIDE BANDWIDTH PHOTONIC BEAMSTEERING PHASED ARRAY

[75] Inventor: Irwin L. Newberg, Northridge, Calif.

[73] Assignee: Hughes Aircraft Company, Los Angeles, Calif.

[21] Appl. No.: 567,848

[22] Filed: Aug. 15, 1990

[51] Int. Cl.$^5$ ............................................. H01Q 3/22
[52] U.S. Cl. .................................... 342/375; 342/374; 342/54
[58] Field of Search ............... 342/368, 371, 372, 373, 342/374, 375, 377, 53, 54

[56] References Cited

U.S. PATENT DOCUMENTS

| | | | |
|---|---|---|---|
| 4,028,702 | 6/1977 | Levine | 342/374 |
| 4,686,533 | 8/1987 | MacDonald et al. | 342/371 X |
| 4,725,844 | 2/1988 | Goodwin et al. | 342/375 X |
| 4,814,773 | 3/1989 | Wechsberg et al. | 342/371 X |
| 4,891,651 | 1/1990 | Staehlin et al. | 342/372 X |
| 4,922,257 | 5/1990 | Saito et al. | 342/371 X |
| 4,929,956 | 5/1990 | Lee et al. | 342/54 X |

Primary Examiner—Thomas H. Tarcza
Assistant Examiner—T. R. Swann
Attorney, Agent, or Firm—Leonard A. Alkov; Wanda Denson-Low

[57] ABSTRACT

A transmit/receive circuit for each of the antenna elements of a radar phased array including an optical fiber true time delay circuit responsive to an electrical RF signal for providing an optical signal having a controlled time delay, an optical fiber for propagating the time delay controlled optical signal, an optical detector circuit responsive to the propagated time delay controlled optical signal for providing a time delay controlled electrical signal, transmit circuitry responsive to the time delay controlled electrical signal for providing to the associated antenna element a transmit signal based on the time delay controlled electrical signal, and receive circuitry responsive to the time delay controlled electrical signal and the signal received by the associated antenna element. A first RF switch selectively couples the time delay controlled electrical signal to the transmit circuit during transmit times, and to the receive circuit during receive times; and a second RF switch couples the associated antenna element to the transmit circuit during transmit times, and to the receive circuit during receive times. The receive circuit further includes analog-to-digital conversion circuitry whose sample timing is controlled so as to provide for the time alignment of the received signal relative to the received signals of the other transmit/receive circuits of the phased array. Alternatively, such time alignment is provided pursuant to processing of the sampled receive signals from the transmit/receive circuits of the phased array.

10 Claims, 3 Drawing Sheets

5,051,754

OPTOELECTRONIC WIDE BANDWIDTH PHOTONIC BEAMSTEERING PHASED ARRAY

BACKGROUND OF THE INVENTION

The disclosed invention is generally directed to beamsteered phased arrays for radar, and is directed more particularly to a photonically beamsteered phase array that utilizes a photonic true time delay circuit for both transmit and receive functions.

A beamsteered phased array is an antenna system comprising individual antenna elements whose antenna beam direction (i.e., pointing direction) is controlled by the relative phases of the signals respectively radiated or received by the antenna elements. In particular, for transmission, the relative phases of the energy radiated by the individual antenna elements is controlled to define the transmit beam direction of the antenna. For receiving, the relative phases of the energy received by the individual elements is controlled to define the receive beam direction of the antenna. The premise of a true time delay beamsteered phased array is to steer the array beam by introducing known time delays into the respective signals transmitted or received by the respective antenna elements.

Photonic true time delay circuits having optical fiber delay lines have attributes that would make them well suited for phased arrays. Such attributes include relatively wide bandwidth, low loss in the fiber, capability for long delays, small size, low weight, resistance to electromagnetic interference, low cross-talk, and the capability of being remotely located from other components in a phased array.

However, optical fiber delay lines are unidirectional, and thus cannot be used in a manner similar to known bi-directional phase shifters. A relatively direct approach to dealing with such uni-directionality would be to utilize separate optical fiber time delay circuits in the transmit and receive paths of the phased array. However, due to considerations including complexity, noise, and dynamic range, photonic elements might not be acceptable in the receive path which must communicate signals of extremely low power.

SUMMARY OF THE INVENTION

It would therefore be an advantage to provide a phased array that utilizes photonic true time delay beamsteering without having photonic beamsteering in the direct receive path.

Another advantage would be to provide a phased array that utilizes photonic interconnects for the respective transmit/receive circuits of the array.

The foregoing and other advantages are provided by the invention in a phased array transmit/receive circuit for each of the antenna elements of the phased array. The transmit/receive circuit includes an optical fiber true time delay circuit responsive to an electrical RF signal for providing an optical signal having a controlled time delay, an optical fiber for propagating the time delay controlled optical signal, an optical detector circuit responsive to the propagated time delay controlled optical signal for providing a time delay controlled electrical signal, transmit circuitry responsive to the time delay controlled electrical signal for providing to the associated antenna element a transmit signal based on the time delay controlled electrical signal, and receive circuitry responsive to the time delay controlled electrical signal and the signal received by the associated antenna element. A first RF switch selectively couples the time delay controlled electrical signal to the transmit circuit during transmit times, and to the receive circuit during receive times; and a second RF switch couples the associated antenna element to the transmit circuit during transmit times, and to the receive circuit during receive times.

The invention more particularly includes true time delay processing means for time aligning the received signal with respect to the received signals of the other transmit/receive circuits of the phase array.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
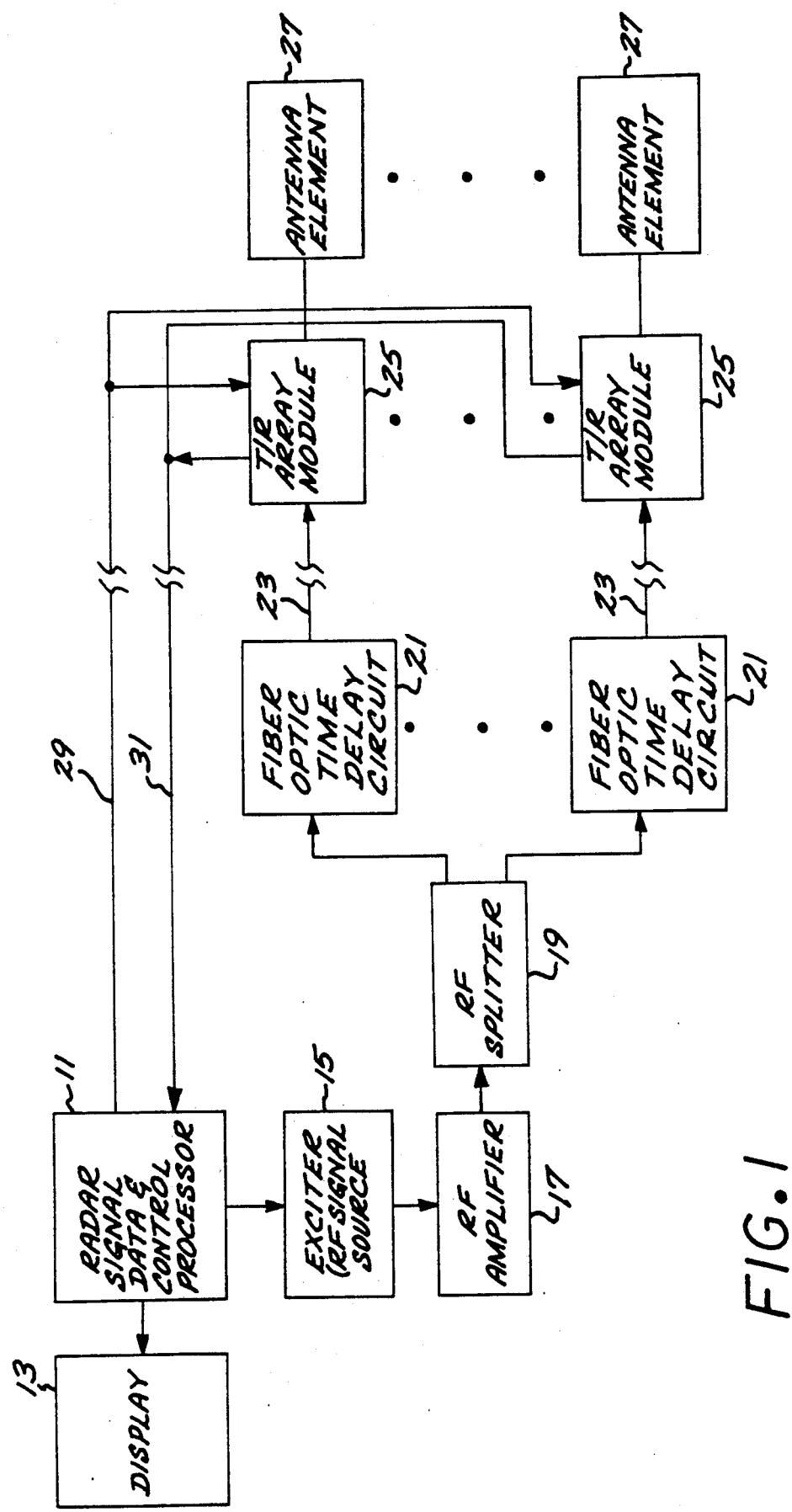
FIG. 1 is a block diagram of a photonically beam-steered phased array in accordance with the invention.

In the following detailed description and in the several figures of the drawing, like elements are identified with like reference numerals.

Referring now to FIG. 1, set forth therein is a broad bandwidth phased array radar system 10 in accordance with the invention. The radar system includes a radar processor 11 and a radar display 13 responsive to the radar processor 11. The radar processor further controls an RF exciter source 15 whose output provided to an RF amplifier 17. The output of the RF amplifier 17 is split by an RF splitter circuit 19 which provides RF inputs to a plurality of fiber optic true time delay circuits 21. By way of illustrative example, each true time delay circuit 21 provides true time delay via fiber optic line length switching as disclosed in "Wideband Fiber-Optic Delay Network For Phased Array Antenna Steering," Ng, Walston, Tangonan, Newberg, Lee, *ELECTRONICS LETTERS.* Vol 25, No. 21, Oct. 12, 1989, pages 1456–1457, and "Electro-Optical Switch for Antenna Beamsteering," Newberg, Walston, Lee, Ng, Tangonan, *SPIE PROCEEDINGS - Optoelectronic Signal Processing for Phased-Array Antennas II,* Vol. 1217, January 1990, pages 126–131, which are incorporated herein by reference.

The optical outputs of the fiber optic true time delay circuits 21 are communicated via respective fiber optic cables 23 to respective transmit/receive array modules 25. The modules 25 are coupled to respective antenna elements 27.

By way of illustrative example, respective fiber optic cables 29 are utilized for communicating multiplexed control signals from the radar processor 11 to the array modules 25, and respective fiber optic cables 31 are utilized to communicate received digital signals from the array modules to the radar processor 11.

By utilizing fiber optic cables for transferring control signals, data, and the true time delayed signals, the array modules 25 can be remotely located from the rest of the phased array radar system. The only electrical connections would be for DC voltage input and RF power output to the antenna elements 27.

Figure 2:
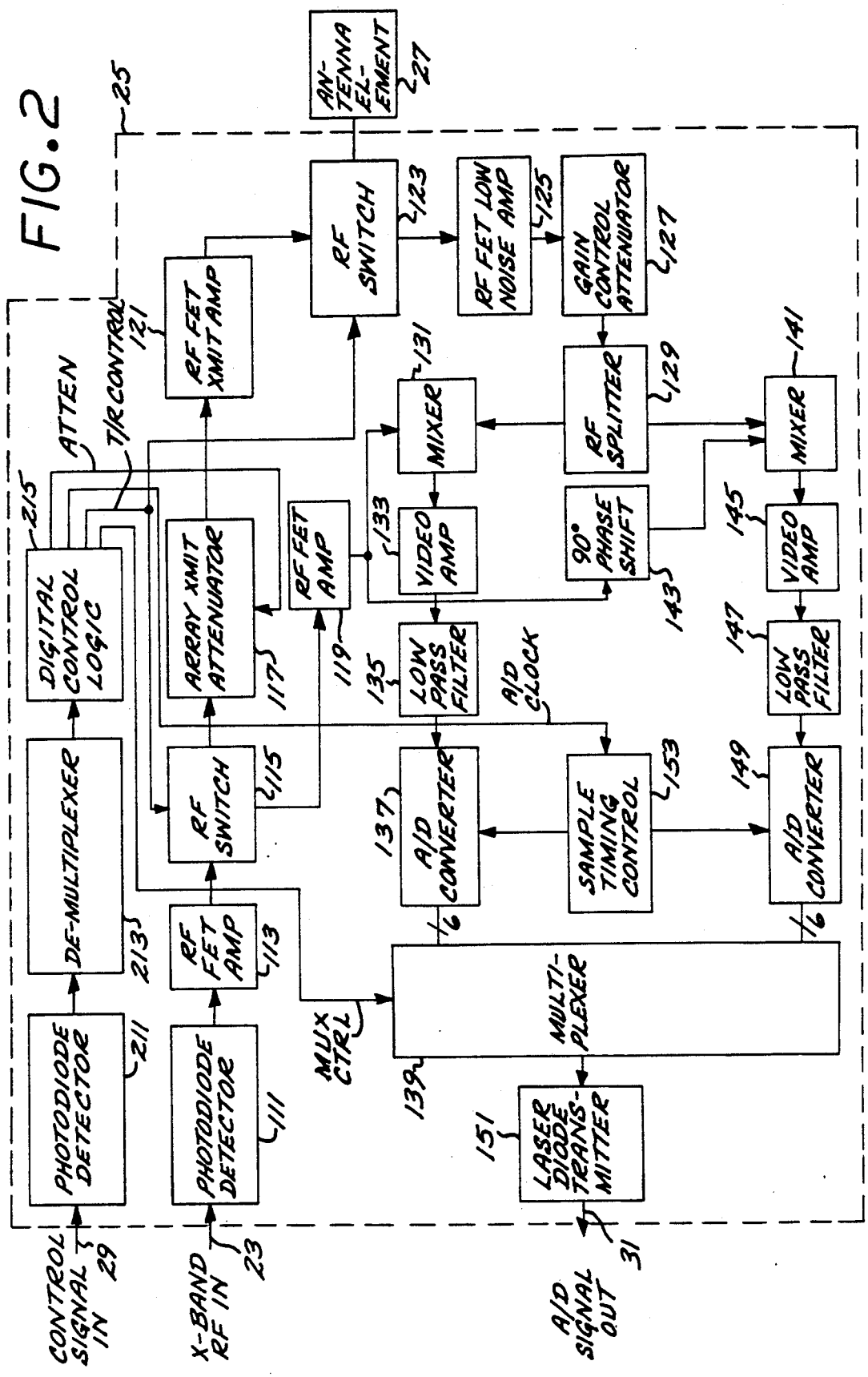
FIG. 2 is a block diagram of one of the array transmit/receive modules of the photonically beam steered phased array of FIG. 1.

Referring now to FIG. 2, shown therein is a block diagram of one of the array transmit/receive modules 25 which includes a photodiode detector circuit 111 that produces an electrical RF signal in response to the RF optical signal communicated via the fiber optic cable 23. The RF output signal of the photodiode detector circuit 111 is provided to an RF amplifier 113 which provides its amplified RF signal to an RF switch 115 that is controlled by a transmit/receive control signal T/R CONTROL. The RF switch 115 is controlled to couple the amplified RF signal to an array transmit attenuator circuit 117 during transmit times and to an RF amplifier 119 during receive times.

The output of the transmit attenuator 117 is coupled to a transmit RF amplifier 121 whose output is provided to an RF switch 123. The RF switch 123 is further coupled to the antenna element 27 associated with the particular array module and also to a receive RF amplifier. The RF switch 123 is controlled by the transmit/receive control signal T/R CONTROL to couple the output of the transmit RF amplifier 121 to the antenna element 27 during transmit times, and to couple the antenna element 27 to the receive RF amplifier 125 during receive times.

In the receive path, the output of the receive RF amplifier 125 is provided to a gain control attenuator 127 whose output is split into two components by an RF power splitter 129.

One output of the power splitter 129 is provided to a mixer 131 which receives the output of the RF amplifier 119 as the local oscillator signal. The output of this in-phase mixer 131 is an in-phase baseband component of the received signal, and is coupled to a video amplifier which provides its output to a low pass filter 135. The output of the low pass filter 135 provides the analog input to an analog-to-digital (A/D) converter 137. The digital output of the A/D converter 137 is provided to a multiplexer 139.

The other output of the power splitter 129 is provided to a mixer 141 which receives, via a 90 degree phase shift circuit 143, a 90 degree phase shifted version of the output of the RF amplifier 119 as the local oscillator signal. The output of this quadrature mixer 141 is a quadrature baseband component of the received signal, and is coupled to a video amplifier 145 which provides its output to a low pass filter 147. The output of the low pass filter 147 provides the analog input to another analog-to-digital (A/D) converter 149. The digital output of the A/D converter 149 is provided to the multiplexer 139 which provides a time-multiplexed signal of the A/D outputs to a laser diode transmitter. The laser diode transmitter provides its optical output to the fiber optic cable 31 (FIG. 1) associated with the particular array module.

The sample timing of the A/D converter 137, 149 is controlled by a sample timing control circuit 153 to provide the appropriate true time delay of the A/D sampling so as to properly align the pulse energy of the signals received by the different transmit/receive modules in the phased array. As discussed further herein, geometrical considerations as to the locations of the array antenna elements results in a return pulse being received by the antenna elements at different times when the pointing direction is other than broadside.

The array module 25 further includes a photodiode detector circuit 211 for detecting the optical signal communicated via the associated control signal fiber optic cable 29. The electrical output of the photodiode detector circuit 211 is provided to a de-multiplexer 213 which provides its output to a digital control logic circuit 215. The control logic circuit 215 provides the transmit/receive signal T/R CONTROL to the RF switches 115, 123; the transmit attenuate control signal ATTEN to the transmit attenuator circuit 117; the sample timing master clock A/D CLOCK to the sample timing control circuit 153; and the receive data multiplexer control signal MUX CTRL.

Figure 3:
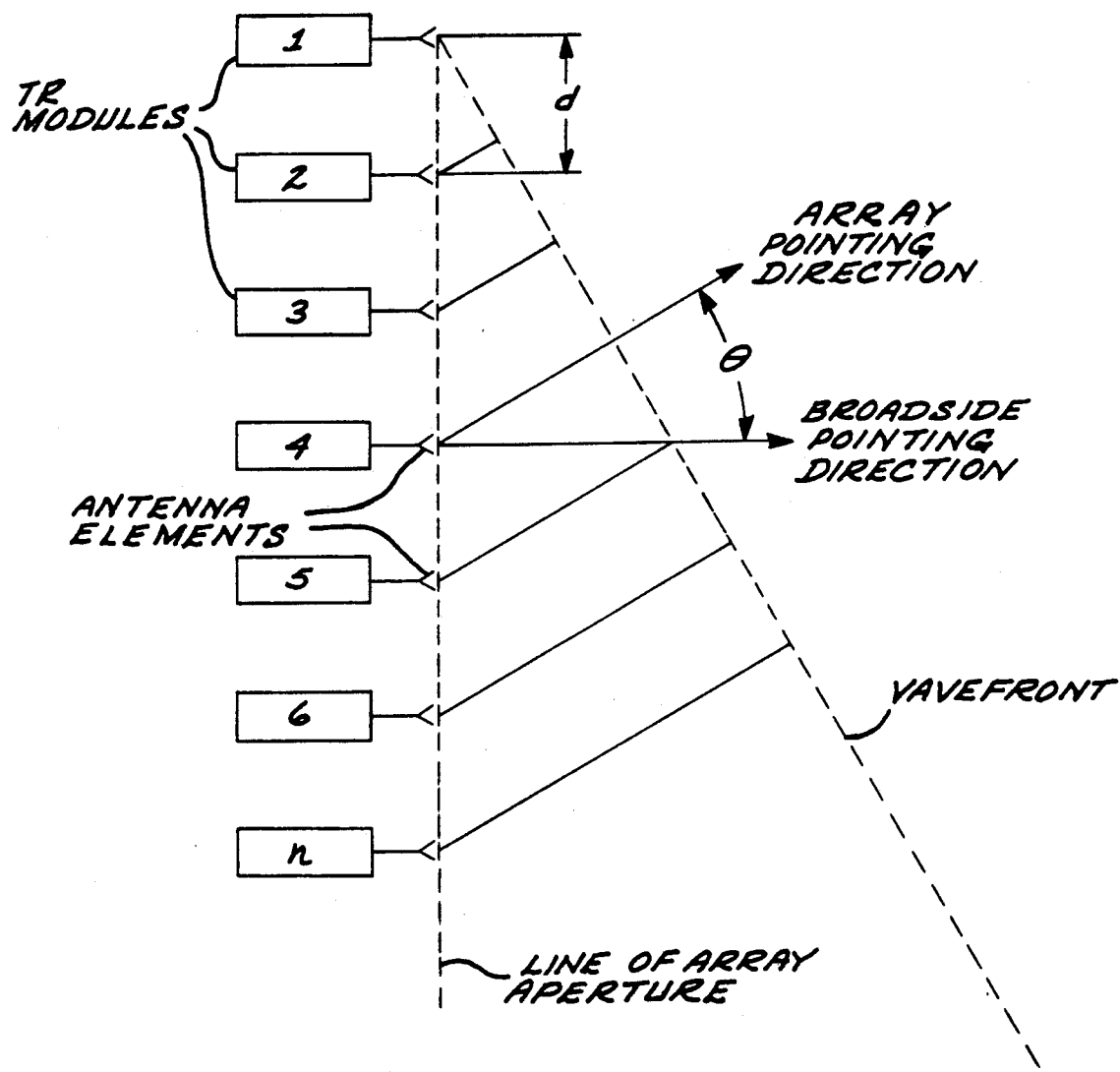
FIG. 3 is a schematic block diagram illustrating the geometrical considerations in a true time delay beam-steered phased array.

Referring now to FIG. 3, the true time delay needed for beamsteering can be looked at in two parts: the time delay or phase needed to steer the continuous wave (CW) carrier, and the time delay needed to align the pulse modulation on the carrier (i.e., the pulse energy). The antenna phase and energy wavefront can be represented by a line normal to the array pointing direction and is wherein the transmitted or received RF energy is in phase and aligned in pulse energy.

To point the antenna array correctly for transmitting, as to all of the antenna elements, the phase of the energy must be the same along the RF wavefront line and the pulse energy must be there at the same time.

To receive the RF signal from the desired pointing direction, the RF wavefront as received by the antenna elements must be appropriately delayed for each element such that "effectively" the phase of the energy would be all the same at each of the radiating elements and the pulse energy "effectively" arrives at each of the antenna elements at the same time. In the subject invention, such phase and time alignment is "effectively" achieved by phase and delay adjustments made after the RF energy is received, such that the signals received by the respective antenna elements are in phase and pulse energy aligned in time prior to summing to form the received beam. In other words, the RF wavefront is adjusted after it reaches the antenna elements.

For transmit, time delay beamsteering delays the carrier and the modulation energy by a time which causes both the phase of the carrier and the energy in the carrier and its modulation to correctly arrive along the RF wavefront line on transmit, and "effectively" arrive at each radiating element on receive at the same phase at and at the same time, independent of frequency. For the received signal, the value of the phase needed to steer the carrier can be generated by true time delay in the LO path as discussed below. As also discussed below, the value of the time delay needed to acing the energy can be obtained by appropriately delaying the clocks at the A/D converters in the receive paths for the respective antenna elements.

Simply stated, time delay on transmit and on receive as discussed above is utilized to achieve substantially the same result if elements were repositioned to be normal to the pointing direction, as would be provided with a mechanical scan antenna.

As a result of true time delay beamsteering via fiber optic line length switching, wide bandwidth and wide instantaneous bandwidth are achieved. Wide bandwidth means the signal carrier frequency can be changed over a wide range, while wide instantaneous bandwidth means the signal carrier modulation is such as to cause many frequencies to be generated simultaneously. In the time domain, wide instantaneous bandwidth means a very short pulse or pulse modulation with very short pulse widths. In wide bandwidth signals used in an antenna array, generally only the phase of the carrier needs to be adjusted for good performance beam pointing. For wide instantaneous bandwidth, both the phase and the pulse timing alignment must be set correctly. The phases must be properly adjusted and the pulse energy must line up in time (or stated another way, substantially all frequency components of the pulse must be delayed appropriately).

The photonic true time delay circuit 21 is used in the transmit path for wide bandwidth and wide instantaneous bandwidth. The same true time delay circuit is used in the LO path for receive only as a wide bandwidth beamsteerer, since the LO signal is a CW signal that is ambiguous in time but does retain the phase information (modulo $2\pi$) set for beamsteering in the true time delay photonic phase shifter. For steering in phase only, the phase is adjusted up to a maximum value of one period of oscillation (i.e., $2\pi$ radians) which is called modulo $2\pi$ phase steering. The invention advantageously utilizes mixing on receive directly to baseband (i.e., the transmit and LO signals are have the same frequency). For this case, the beamsteering settings, as set by the true time delay circuit 21, remain the same for both transmit and receive. The true time delay circuit 21 has the correct phase on receive since the correct carrier phase is set by having used the same true time delay setting as used on transmit. True time delay in the receive path is achieved by having the correct phase setting and pulse alignment for the signal received at each antenna element.

The subject invention requires that the radar have the capability to independently mix the return signal at each radiating element (or sub-array designed to work with true time delay subarray beamsteering) of a phased array. For the case on receive, in this invention, when true time delay beamsteering is needed (r.e., for wide bandwidth and wide instantaneous bandwidth signals), the photonic true time delay circuit provides the correct phase steering on receive; and the sample timing control 153 is used to set the delay for the given transmit/receive module so that the pulse energy received by the array is properly aligned in time. By way of illustrative example, the sample timing control 153 comprises photonic true time delay circuitry, digital delay circuitry, or other circuitry that would be controlled to provide the appropriate delay relative to the master sample clock A/D CLOCK in real time. The previously identified papers disclose photonic true time delay circuitry that can be utilized in the sample timing control 153.

It should be appreciated that other receive signal delay means can be utilized including digital beam forming, which would be implemented with the radar processor 11 (i.e., the sample timing control 153 would not be utilized).

Thus, the true time delay LO signal provides the correct phase on the received signals so they add in phase for the desire antenna beam pointing angle. The receive time delay means referred to above assures the signals from the array antenna elements are aligned to assure the modulation on the carrier signal (i.e., simple pulse or complicated phase coding for pulse compression) is "lined up" in time. In the majority of cases, the time alignment of the return signals at the analog-to-digital converters are not needed since the instantaneous bandwidth, antenna length, scan angle and carrier frequency (wavelength) are such as to not require alignment of the pulse energy since the effects are small enough to be neglected. The usual case is the need for broad bandwidth only (without the need for wide instantaneous bandwidth) and this technique for use of the photonic true time delay circuit in the LO path provides the required modulo $2\pi$ beamsteering.

In the illustrative embodiment discussed above, the sample timing control circuit 153 provides a clock signal to the A/D converters that have been delayed such that the envelopes of the receive signals from all of the elements in the array will be summed at the processor with the correct delays so the wide bandwidth signals will "line" up so their energy will add. Also, digital beamforming or A/D converter range sample interpolation can be used to obtain the same result, making sure the energy in the radar pulse add up to form the return radar signal.

The array transmit/receive module shown in FIG. 2 has several other attributes. The transmit/receive module has only three photonic fiber optic link cables as inputs and outputs and the necessary power connections. Thus, the module has only several "cables" as inputs and outputs; namely the three fiber optic links for the RF transmit/local oscillator signal, the control signals, and digitized receive signal, the power connections, and the connection to the antenna element. The only connections that need to be electrical are the power and the antenna element connections. The use of primarily fiber optic connections to the transmit/receive circuit allows for an array with simple module interconnects; simple RF, digital and power manifold; ease of remoting to the rest of the radar from the transmit/receive modules; fusion splicing for fiber cables rather than connectors; and flexible and independent manifolding for multiple frequencies and waveforms. The number of fiber optic cables can be further reduced by optical wavelength multiplexing, and/or electronic digital multiplexing with both RF and other digital signals; and also the potential of sending the dc power over cable shielding or metal coated fiber allows for possible "single" cable non-connectorized interface to the modules.

The foregoing has been a disclosure of a true time delay photonically beamsteered phased array that provides for wide bandwidth and wide instantaneous bandwidth beam steering of radar or other avionic/communication systems. The invention advantageously utilizes a single photonic true time delay circuit for both transmit and receive functions, wherein an electrical replica of the photonic time delay circuit output is utilized for the transmit signal for and for the local oscillator in the receive path for converting the received signal to baseband for further processing. The received baseband signal is further processed to provide proper alignment of the modulation energy received by the elements of the array, for example by controlling the sample timing of the receive A/D converter, digital beamforming, or range interpolation. As a result of using photonic elements, the disclosed phased array has the attributes of wide signal bandwidth, low loss in the optical fibers, the capability of long delays, small size, low weight, and the capability of locating components at remote locations.

Although the foregoing has been a description and illustration of specific embodiments of the invention, various modifications and changes thereto can be made by persons skilled in the art without departing from the scope and spirit of the invention as defined by the following claims.

What is claimed is:

1. In a phased array radar system having a radar processor and a plurality of antenna elements, a transmit/receive circuit for each of the antenna elements comprising:
   an optical fiber true time delay circuit responsive to an electrical RF signal for providing an optical signal having a controlled time delay relative to the outputs of the optical fiber true time delay circuits of the other transmit/receive circuits in the array;
   optical means for propagating said true time delay controlled optical signal;
   optical detection means responsive to the propagated true time delay controlled optical signal for providing a true time delay controlled electrical signal;
   transmit means responsive to said true time delay controlled electrical signal for providing a transmit signal based on said true time delay controlled electrical signal to the associated antenna element;
   receive means responsive to said true time delay controlled electrical signal and the signal received by the associated antenna element for providing a baseband received signal, said true time delay controlled electrical signal being utilized as the local oscillator signal to provide the correct phase for steering the array;
   true time delay processing means responsive to said baseband received signal for providing a digital received signal that is properly aligned relative to the digital received signals provided by the receive means of the other transmit/receive circuits of the array;
   first switching means for coupling said true time delay controlled electrical signal to said transmit means during transmit times, and to said receive means during receive times; and
   second switching means for coupling the associated antenna element to said transmit means during transmit times, and to said receive means during receive times.

2. The transmit/receive circuit of claim 1 wherein said true time delay processing means includes:
   analog to digital conversion means for sampling said baseband received signal; and
   sample timing control means for controlling the sample timing of said analog to digital conversion means relative to the sample timing of the other transmit/receive circuits in the array.

3. The transmit/receive circuit of claim 2 wherein said sample timing control means comprises a fiber optic true time delay circuit.

4. The transmit/receive circuit of claim 1 wherein said true time delay processing means includes:
   analog to digital conversion means for sampling said baseband received signal to provide a sampled receive signal; and
   processing means responsive to said sampled receive signal for aligning said sampled receive signal with the sampled receive signals provided by the other transmit/receive circuits of the array.

5. In a phased array radar system having a radar processor and a plurality of antenna elements, a transmit/receive circuit for each of the antenna elements comprising:
   an optical fiber true time delay circuit responsive to an electrical RF signal for providing an optical signal having a controlled time delay relative to the outputs of the optical fiber true time delay circuits of the other transmit/receive circuits in the array;
   optical means for propagating said true time delay controlled optical signal;
   optical detection means responsive to the propagated true time delay controlled optical signal for providing a true time delay controlled electrical signal;
   transmit means responsive to said true time delay controlled electrical signal for providing a transmit signal based on said true time delay controlled electrical signal to the associated antenna element;
   receive means responsive to said true time delay controlled electrical signal and the signal received by the associated antenna element for providing a baseband received signal, said true time delay controlled electrical signal being utilized as the local oscillator signal to provide the correct phase for steering the array;
   analog to digital conversion means responsive to said baseband received signal for providing a digital received signal;
   optical means responsive to digital received signal for providing an optical received signal to the radar processor;
   first switching means for coupling said true time delay controlled electrical signal to said transmit means during transmit times, and to said receive means during receive times; and
   second switching means for coupling the associated antenna element to said transmit means during transmit times, and to said receive means during receive times.

6. The transmit/receive circuit of claim 5 further including sample timing control means for controlling the sample timing of said analog to digital conversion means relative to the sample timing of the other transmit/receive circuits in the array.

7. The transmit/receive circuit of claim 6 wherein said sample timing control means includes a fiber optic true time delay circuit.

8. The transmit/receive circuit of claim 5 further including means responsive to said digital receive signal and to the digital receive signals of the other transmit/receive circuits in the array for providing digital beamforming.

9. In a phased array radar system having a radar processor and a plurality of antenna elements, a transmit/receive circuit for each of the antenna elements comprising:
   an optical fiber phase true time delay circuit responsive to an electrical RF signal for providing an optical signal having a controlled time delay relative to the outputs of the optical fiber true time delay circuits of the other transmit/receive circuits in the array;
   optical means for propagating said true time delay controlled optical signal;
   optical detection means responsive to the propagated true time delay controlled optical signal for providing a true time delay controlled electrical signal;
   transmit means responsive to said true time delay controlled electrical signal for providing a transmit signal based on said true time delay controlled electrical signal to the associated antenna element;
   receive means responsive to said true time delay controlled electrical signal and the signal received by the associated antenna element for providing a baseband received signal, said true time delay controlled electrical signal being utilized as the local oscillator signal to provide the correct phase for steering the array;

first switching means for coupling said true time delay controlled electrical signal to said transmit means during transmit times, and to said receive means during receive times; and second switching means for coupling the associated antenna element to said transmit means during transmit times, and to said receive means during receive times.

10. The transmit/receive circuit of claim 9 further including means responsive to said baseband receive signal for providing an optical receive signal to the radar processor.

* * * * *